(12) United States Patent
Smith, Jr.

(10) Patent No.: US 12,729,549 B2
(45) Date of Patent: Sep. 8, 2026

(54) DECK LATCH ASSEMBLY FOR A SCAFFOLD PLATFORM

(71) Applicant: Grady F. Smith & Co., Inc., Greenville, NC (US)

(72) Inventor: Grady Ferrell Smith, Jr., Raleigh, NC (US)

(73) Assignee: Grady F. Smith & Co., Inc., Greenville, NC (US)

( * ) Notice: Subject to any disclaimer, the term of this patent is extended or adjusted under 35 U.S.C. 154(b) by 414 days.

(21) Appl. No.: 18/376,631

(22) Filed: Oct. 4, 2023

(65) Prior Publication Data

US 2025/0116126 A1 Apr. 10, 2025

(51) Int. Cl.

| | |
|---|---|
| ***E04G 7/34*** | (2006.01) |
| ***E04G 1/14*** | (2006.01) |
| ***E04G 1/20*** | (2006.01) |
| ***E04G 1/30*** | (2006.01) |

(Continued)

(52) U.S. Cl.

CPC ................ *E04G 7/34* (2013.01); *E04G 1/14* (2013.01); *E04G 1/20* (2013.01); *E04G 1/30* (2013.01); *F16B 2/06* (2013.01); *E04G 2001/242* (2013.01); *E04G 2001/305* (2013.01)

(58) Field of Classification Search

CPC .. E04G 7/28; E04G 5/045; E04G 1/15; E04G 7/34

See application file for complete search history.

(56) References Cited

U.S. PATENT DOCUMENTS

| | | | | |
|---|---|---|---|---|
| 1,178,610 A * | 4/1916 | Weiss | E04G 7/18 403/399 |
| 1,356,774 A * | 10/1920 | Lanchester | B62D 25/105 180/69.2 |
| 1,593,945 A | 7/1926 | Macklem | |

(Continued)

FOREIGN PATENT DOCUMENTS

| | | |
|---|---|---|
| AU | 2005200865 A1 * | 9/2006 |
| CN | 206971708 U | 2/2018 |

(Continued)

OTHER PUBLICATIONS

U.S. Pat. No. 325,221A to Wright patented Aug. 25, 1885. No title available.
U.S. Pat. No. 720,451 to Luellen patented Feb. 10, 1903.

*Primary Examiner* — Daniel P Cahn
*Assistant Examiner* — Benjamin Alexander Pezzlo
(74) *Attorney, Agent, or Firm* — COATS & BENNETT, PLLC

(57) ABSTRACT

A scaffold has latch assemblies that are configured to hold a deck of the scaffold against a side rail of the scaffold. The latch assemblies include a shaft that is configured to extend through slots in the side rail. A locking tab at the end of the shaft presses against the deck due to action of a spring that urges the shaft downward relative to the side rail. The deck advantageously has an edge recess that receives the locking tab. The edge recess may be sized so that lock tab is flush with or below the top surface of the deck. A collar is slidably disposed on the shaft and is interposed between the bias element and the locking tab and is configured to help prevent the bias element from becoming entangled in the slot. The disclosure also relates to related latch assemblies, side rail assemblies, and methods.

19 Claims, 11 Drawing Sheets

(51) Int. Cl.
*F16B 2/06* (2006.01)
*E04G 1/24* (2006.01)

(56) References Cited

U.S. PATENT DOCUMENTS

| | | | | |
|---|---|---|---|---|
| 1,807,943 | A | 6/1931 | Sutton | |
| 2,525,204 | A | 10/1950 | Calabro | |
| 2,639,951 | A | 5/1953 | Allenbaugh | |
| 2,651,093 | A | 9/1953 | Lynch | |
| 2,710,233 | A * | 6/1955 | Dussault | E04G 7/28 403/409.1 |
| 2,778,087 | A | 1/1957 | Krueper, Jr. | |
| 2,831,734 | A * | 4/1958 | Rapoport | E04G 7/305 403/18 |
| 2,915,151 | A | 12/1959 | Kekenak | |
| 2,928,443 | A | 3/1960 | Sevachko | |
| 2,993,254 | A | 7/1961 | Larson | |
| 3,101,964 | A * | 8/1963 | Reaser | A01K 91/04 D19/171 |
| 3,105,667 | A * | 10/1963 | Bauer | E06C 7/50 248/499 |
| 3,116,079 | A * | 12/1963 | Doolittle | E04G 7/28 411/401 |
| 3,249,973 | A | 5/1966 | Seckerson | |
| 3,367,689 | A | 2/1968 | McCarthy | |
| 3,396,817 | A * | 8/1968 | Perry | E04G 1/20 182/119 |
| 3,429,013 | A | 2/1969 | Pabich et al. | |
| 3,486,785 | A * | 12/1969 | Corson | B60P 3/32 296/167 |
| 3,638,895 | A * | 2/1972 | Henson | B60P 3/36 296/167 |
| 3,827,110 | A | 8/1974 | Dzus, Sr. et al. | |
| 3,943,674 | A * | 3/1976 | Ray | E04F 15/02423 52/126.6 |
| 3,968,616 | A | 7/1976 | Gostling | |
| 4,129,393 | A | 12/1978 | Sickler | |
| 4,187,929 | A | 2/1980 | Cyr | |
| 4,207,655 | A | 6/1980 | MacMaster | |
| 4,427,191 | A | 1/1984 | Hess | |
| 4,430,838 | A | 2/1984 | Bains | |
| 4,610,362 | A | 9/1986 | Remp et al. | |
| 4,706,822 | A | 11/1987 | Remp, Jr. et al. | |
| 4,715,095 | A | 12/1987 | Takahasi | |
| 4,793,438 | A * | 12/1988 | Perry | E04G 1/20 182/112 |
| 5,000,290 | A * | 3/1991 | Seely | E04G 7/28 182/119 |
| 5,099,953 | A | 3/1992 | Stegath | |
| 5,156,233 | A | 10/1992 | Olsen et al. | |
| 5,309,692 | A | 5/1994 | Hayashi et al. | |
| 5,390,761 | A * | 2/1995 | Perry | E04G 7/305 248/248 |
| 5,401,354 | A | 3/1995 | Colucci | |
| 5,467,972 | A | 11/1995 | Lee et al. | |
| 5,513,837 | A | 5/1996 | Osborn | |
| 5,688,093 | A | 11/1997 | Bowers | |
| 5,716,154 | A | 2/1998 | Miller et al. | |
| 6,196,758 | B1 | 3/2001 | Scarborough | |
| 6,354,402 | B1 | 3/2002 | Masino | |
| 6,471,003 | B2 * | 10/2002 | Wyse | E06C 1/39 182/119 |
| 8,806,952 | B1 | 8/2014 | Glass | |
| 8,807,612 | B2 | 8/2014 | Hagelskjaer | |
| 8,864,100 | B2 | 10/2014 | Ward | |
| 9,663,962 | B1 | 5/2017 | Whittemore | |
| 10,131,193 | B2 | 11/2018 | Degenkolb | |
| 10,294,078 | B2 | 5/2019 | Minami et al. | |
| 10,472,145 | B2 | 11/2019 | Lu | |
| 11,377,864 | B2 | 7/2022 | MacKarvich | |
| 2004/0050621 | A1 | 3/2004 | Masino et al. | |
| 2004/0188176 | A1 | 9/2004 | Wyse | |
| 2005/0191123 | A1 | 9/2005 | Wertz et al. | |
| 2009/0127027 | A1 | 5/2009 | Bird | |
| 2013/0248290 | A1 | 9/2013 | Kreller | |
| 2018/0179768 | A1 | 6/2018 | Obayashi | |
| 2018/0245382 | A1 | 8/2018 | Ramsauer | |
| 2019/0106891 | A1 | 4/2019 | Jackson et al. | |
| 2020/0347618 | A1 | 11/2020 | Behrbohm | |
| 2021/0010284 | A1 | 1/2021 | MacKarvich | |
| 2021/0062580 | A1 | 3/2021 | Smith | |
| 2021/0134840 | A1 | 5/2021 | Lee et al. | |
| 2021/0222442 | A1 | 7/2021 | Smith | |
| 2021/0277673 | A1 | 9/2021 | Gaiser et al. | |
| 2022/0003012 | A1 | 1/2022 | MacKarvich | |
| 2022/0186507 | A1 | 6/2022 | Smith | |
| 2022/0325538 | A1 | 10/2022 | Smith | |
| 2022/0381046 | A1 | 12/2022 | Qiao et al. | |
| 2023/0047812 | A1 | 2/2023 | Eckhardt et al. | |
| 2023/0272627 | A1 | 8/2023 | Smith | |
| 2024/0392588 | A1 | 11/2024 | Smith | |

FOREIGN PATENT DOCUMENTS

| | | | | | |
|---|---|---|---|---|---|
| CN | 208702110 | U | | 4/2019 | |
| CN | 209509475 | U | * | 10/2019 | |
| CN | 111997354 | A | * | 11/2020 | E04G 5/08 |
| DE | 4324194 | C1 | * | 8/1994 | E04G 1/154 |
| GB | 710349 | A | * | 6/1954 | E04G 7/28 |
| GB | 2306562 | A | * | 5/1997 | E04G 7/28 |
| KR | 2020090001697 | U | | 2/2009 | |
| KR | 101353248 | B1 | * | 1/2014 | E04G 7/28 |
| KR | 101399776 | B1 | * | 5/2014 | E04G 7/28 |
| WO | 2022212490 | A1 | | 10/2022 | |
| WO | 2022217163 | A1 | | 10/2022 | |

* cited by examiner

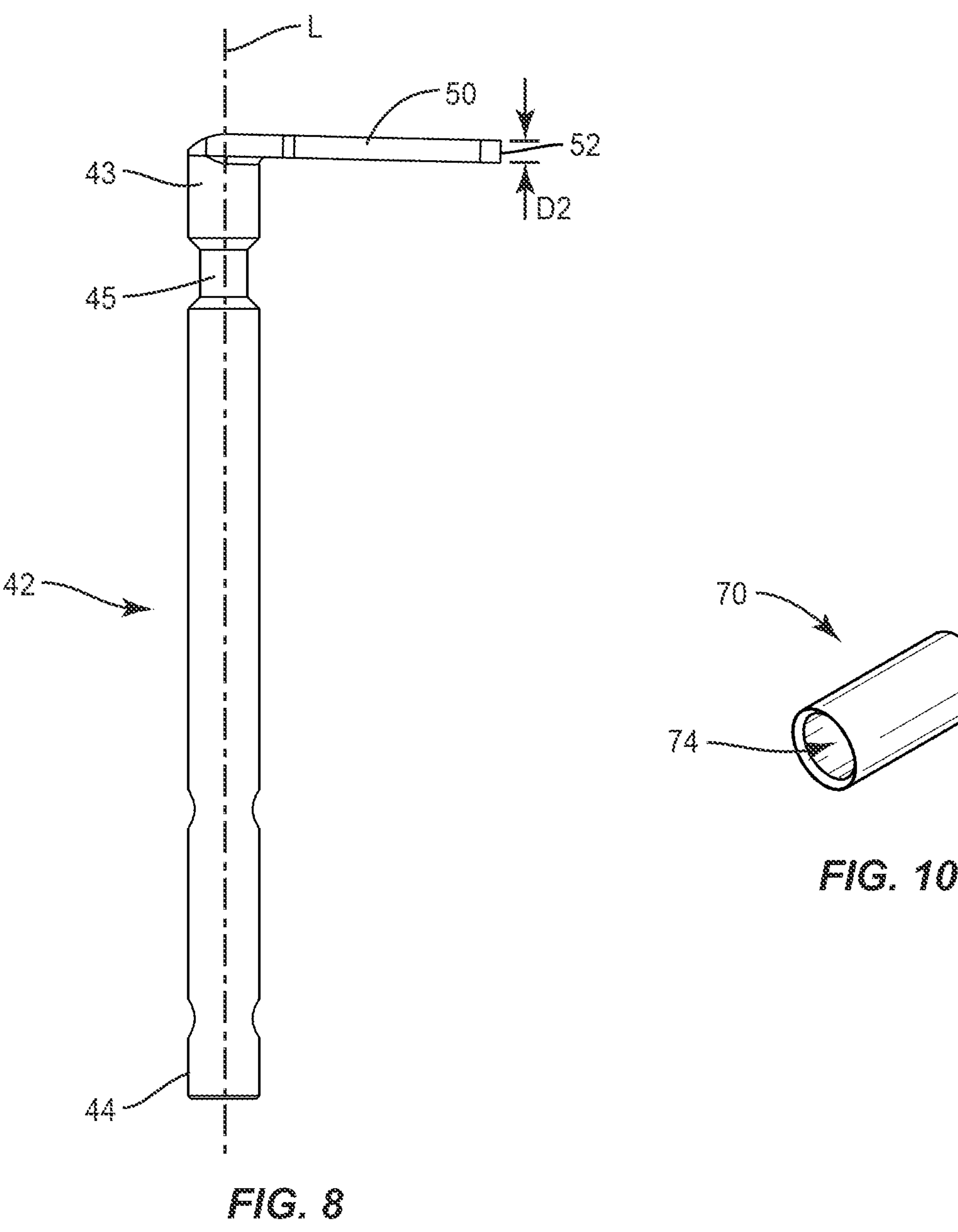
FIG. 8
FIG. 10
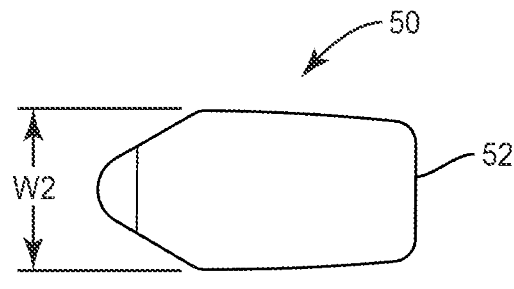
FIG. 9

DECK LATCH ASSEMBLY FOR A SCAFFOLD PLATFORM

TECHNICAL FIELD

The present disclosure relates generally to lightweight scaffolding and, more particularly, to a deck latch assembly for a scaffold platform and related assemblies.

BACKGROUND

Lightweight scaffolds made from metal tubing are commercially available for use when working close to the ground. One such scaffold comprises an adjustable height platform supported between two ladder frames. The platform includes two side rails with guide channels at each end thereof, and a deck that is supported by the side rails. The guide channels slide up and down along the vertical supports of the ladder frames to allow the height of the platform to be adjusted.

The deck of the platform rests on the side rails on either side of the deck and is held in place by a scaffold deck latch that holds the deck down against support surfaces on the side rails. In a conventional scaffold, the scaffold deck latch includes an L-shaped pin mounted externally on the side rail that rotates out of the way while the deck is being put into place, and then rotates back after the deck is in place so that the latch extends over the top surface of the deck to prevent the deck from lifting off of the side rails.

There are some drawbacks with conventional scaffold deck latch designs. Because the conventional deck latch extends above the top surface of the deck, it may present a tripping hazard to workers standing on the deck. Also, a worker may accidentally kick and disengage the conventional deck latch. If the conventional deck latch becomes disengaged, the deck may shift and/or become dislodged, which is undesirable.

Accordingly, there is a need for a new deck latch design that may be more appropriate for some situations.

SUMMARY

The present disclosure relates to a scaffold having latch assemblies that are configured to hold a deck of the scaffold against a side rail of the scaffold. The latch assemblies include a shaft that is configured to extend through slots in the side rail. A locking tab at the end of the shaft presses against the deck due to action of a bias element (e.g., spring) that urges the shaft of the latch assembly downward relative to the side rail. The deck advantageously has an edge recess that receives the locking tab. The edge recess may advantageously be sized so that lock tab is flush with or below the top surface of the deck when received in the recess. A collar is slidably disposed on the shaft and is interposed between the bias element and the locking tab and is configured to help prevent the bias element from becoming entangled in the slot. The disclosure also relates to related latch assemblies, side rail assemblies, and methods.

In one or more embodiments, the disclosure relates to a twist latch assembly for a scaffold deck. The latch assembly includes an elongate shaft, a locking tab, a collar, and a compressible bias element. The shaft has an upper end portion and a lower end portion disposed along a shaft longitudinal axis. The lower end portion has first and second protrusions transverse to the longitudinal axis and spaced from each other. The locking tab extends from the upper end portion of the shaft in cantilever fashion and extends laterally away from the shaft longitudinal axis. The first protrusion is located closer to the locking tab than the second protrusion. The collar slidably disposed on the shaft proximate the locking tab. The compressible bias element is disposed about the shaft between the first protrusion and the collar and biases the collar toward the locking tab. The collar is slidable between a normal position closer to the locking tab and a retracted position farther from the locking tab. In some embodiments, the shaft includes a reduced sized section in the upper end portion proximate the locking tab, with the collar disposed so as to cover the reduced sized section when the collar is in the normal position, but expose the reduced size section in the retracted position.

In one or more embodiments, the disclosure relates to a side rail assembly for a scaffold that includes a side rail and a twist latch assembly. The side rail is configured to be supported between two ladder frames in first and second orientations. The side rail includes first and second support surfaces for supporting a deck of the scaffold in the first and second orientations respectively, with the first and second support surfaces disposed on opposing sides of a horizontal plane. The side rail includes upper and lower outer sections disposed generally parallel to and farther from the horizontal plane than the first and second support surfaces. The side rail includes first and second slots disposed in the upper and lower outer sections, respectively, with the first and second slots being vertically aligned. The twist latch assembly includes a shaft, a collar slidable along the shaft, a locking tab, and a compressible bias element to bias the locking tab into engagement with the deck and secure the deck against one of the support surfaces of the side rail depending on the orientation of the side rail assembly. The twist latch assembly is configured to be removably engaged with the first and second slots of the side rail in both the first and second orientations. The twist latch assembly is configured so that the collar is disposed between the bias element and the first slot when the locking tab is engaged with the deck and the deck is resting on the first support surface. In some embodiments, each slot includes a channel extending parallel to a longitudinal axis of the side rail; a first hole that is wider than the channel and the shaft; a second hole that is spaced away from, and wider than, the first hole; with both the first hole and the second hole intersecting the channel.

In one or more embodiments, the disclosure relates to a scaffold that includes first and second ladder frames and an adjustable height platform. The adjustable height platform is configured to be supported between the first and second ladder frames at a user selected height in an adjustment range. The adjustable height platform includes a pair of side rail assemblies, and a deck. The spaced-apart side rail assemblies extends between the ladder frames, and each side rail assembly includes a side rail. The deck is supported on opposing sides by the side rails. The deck includes at least one recess in a top surface of the deck adjacent to one of the edges of the deck. At least one twist latch assembly is removably mounted to each side rail. Each twist latch assembly includes a shaft, a locking tab, a bias element, and a collar. The locking tab is configured for engagement with the recess in the top surface of the deck to secure the deck on the side rails. The bias element is configured to bias the locking tab into engagement with a corresponding recess of the at least one recess. The collar slidable is on the shaft and disposed between the bias element and the locking tab. Each twist latch assembly extends through corresponding slots in a corresponding side rail and is rotatable between: a disengaged position where the locking tab does not overlap the deck allowing the deck to be installed or removed from the side rials; and an engaged position in which the locking tab extends over the top surface of the deck and engages with a respective one of the recesses in the deck so that the lock tab is flush with or below the top surface of the deck. In some embodiments, each slot comprises: a channel extending parallel to a longitudinal axis of the side rail; a first hole that is wider than the channel; a second hole that is spaced away from, and wider than, the first hole; with both the first hole and the second hole intersecting the channel. The shaft of the twist latch assembly may optionally have a cross section sized to be larger than the first hole and smaller than the second hole, with the shaft having a reduced size section that is sized to fit through the channel. The reduced size section is configured to slide within the channel during installation of the twist latch assembly into the corresponding side rail, and the collar is collar is slidable along the shaft to selectively cover and expose the reduced size section.

In one or more embodiments, the disclosure relates to methods of making and/or using the above.

Note that the various features discussed above and/or below can be achieved independently in various aspects or may be combined in yet other aspects, further details of which can be appreciated with reference to the disclosure herein.

BRIEF DESCRIPTION OF THE DRAWINGS

FIG. 8 shows a side view of a shaft of the latch assembly of FIG. 7.

FIG. 9 shows a top view of the locking tab of the latch assembly of FIG. 7.

FIG. 10 shows perspective view of the collar of the latch assembly of FIG. 7.

DETAILED DESCRIPTION

Figure 1:
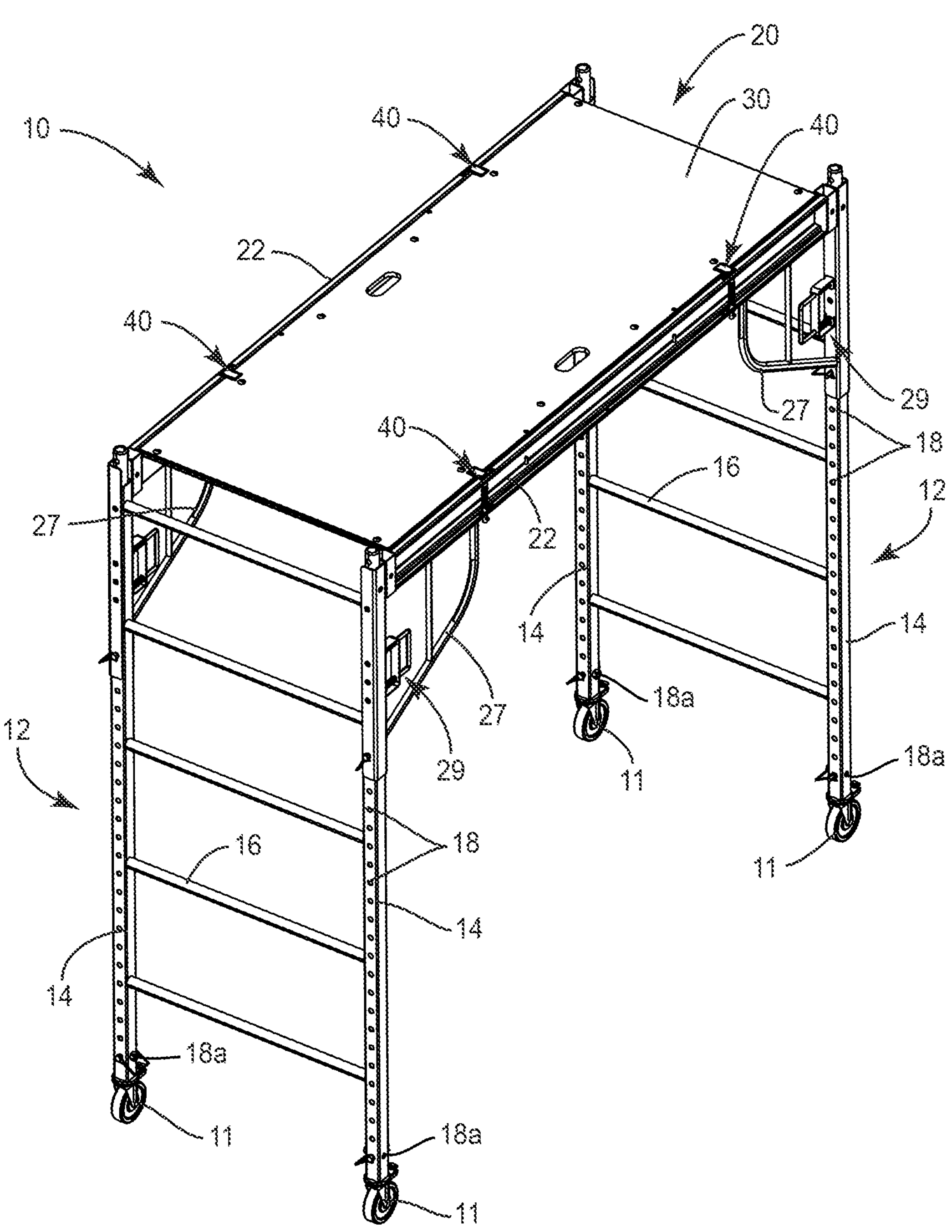
FIG. 1 shows a perspective view of a multi-function scaffold including two ladder frames and an adjustable height platform according to a first embodiment.

The present disclosure relates to a scaffold 10 having one or more latch assemblies 40 that are configured to hold a deck 30 of the scaffold 10 against a side rail 22 of the scaffold. The latch assemblies 40 include a shaft 42 that extends through slot(s) 25 in the side rail 22. A locking tab 50 at the end of the shaft 25 presses against the deck 30 due to action of a bias element (e.g., spring) 60 that urges the shaft 42 of the latch assembly 40 downward relative to the side rail 22. The deck 30 advantageously has an edge recess 33 that receives the locking tab 50. A collar 70 is slidably disposed on the shaft 42, is interposed between the bias element 60 and the locking tab 50, and is configured to help prevent the bias element 60 from becoming entangled in the slot 25.

Figure 2:
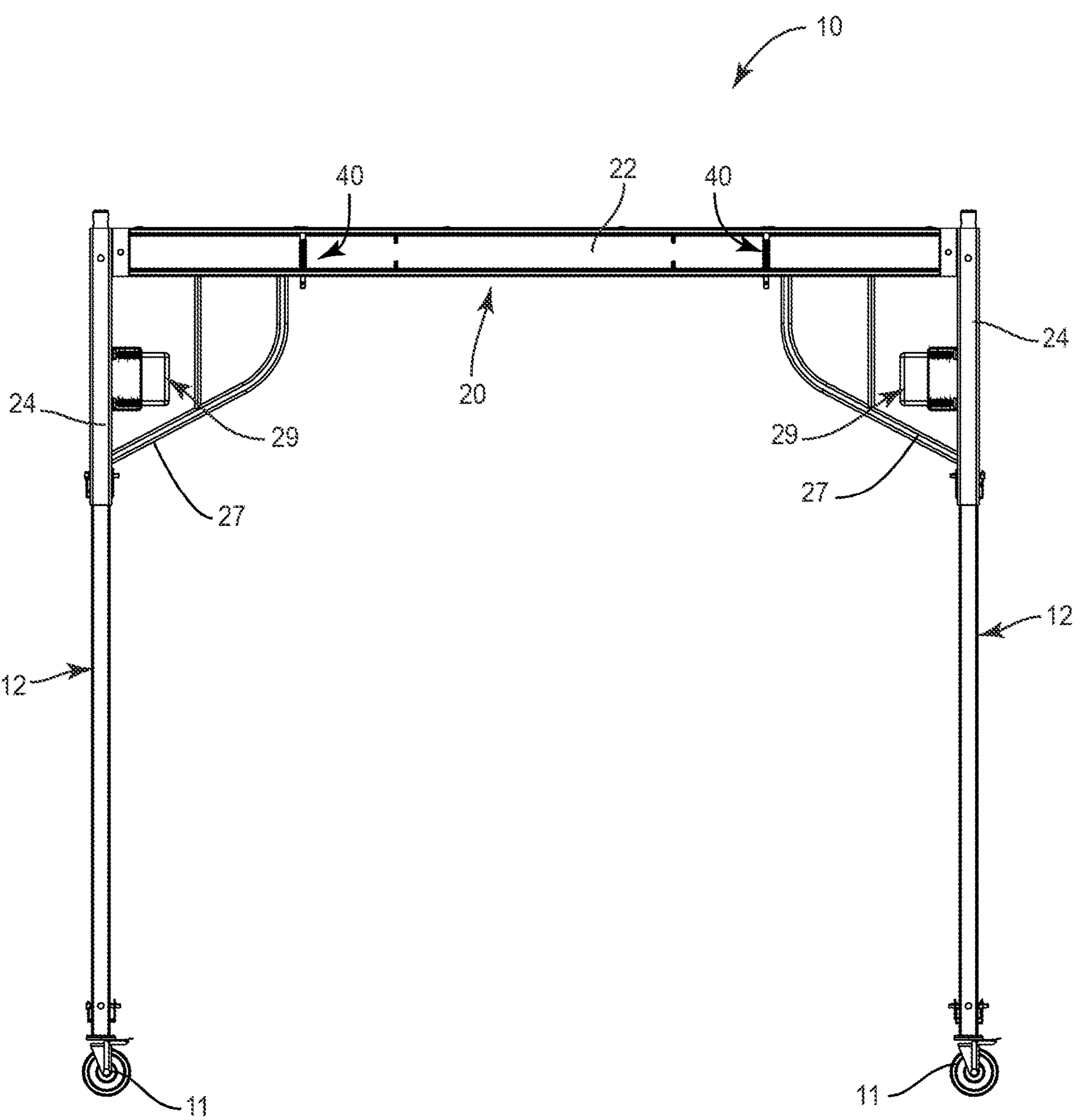
FIG. 2 shows a side view of the scaffold of FIG. 1 with the platform in a normal orientation and adjusted to a top of the ladder frame.

Referring now to the drawings, FIG. 1 shows a scaffold 10 according to an exemplary embodiment. The scaffold 10 is multi-purpose and includes two ladder frames 12 and an adjustable height platform 20 supported between the two ladder frames 12. As described in greater detail below, the adjustable height platform 20 can be mounted between the ladder frames 12 in two different orientations depending on a height requirement for a task. The first or normal orientation shown in FIG. 2 enables the platform 20 to be adjusted to its maximum height. The second or inverted orientation shown in FIG. 3 enables the platform 20 to be adjusted to its minimum height. The first orientation is for relatively greater heights, i.e., farther from the ground, and the second orientation is for relatively lower heights, i.e., closer to the ground.

Each ladder frame 12 includes two vertical supports 14 connected by two or more cross members 16 that serve as ladder rungs. The vertical supports 14 and cross members 16 are preferably made of a metal tubing or other tubular material. The cross members 16 are preferably welded at each end to respective ones of the vertical supports 14 so that each ladder frame 12 is a unitary structure.

A series of aligned openings 18 extend through the vertical supports 14 perpendicular to the plane of the ladder frame 12 and are spaced apart. The openings 18 are designed to be engaged by a releasable locking mechanism 29 on the platform 20 to secure the platform 20 at a desired height between the ladder frames 12. Other openings 18*a* may optionally extend transversely through the lower end of each vertical support 14. These other openings 18*a* may be used to secure casters 11 to the vertical supports 14 when the side rail 20 is in the lowermost position. In some embodiments, the casters 11 can be replaced by footpads, level jacks, socket levelers (not shown), or other ground-engaging members, as is known in the art.

Figure 3:
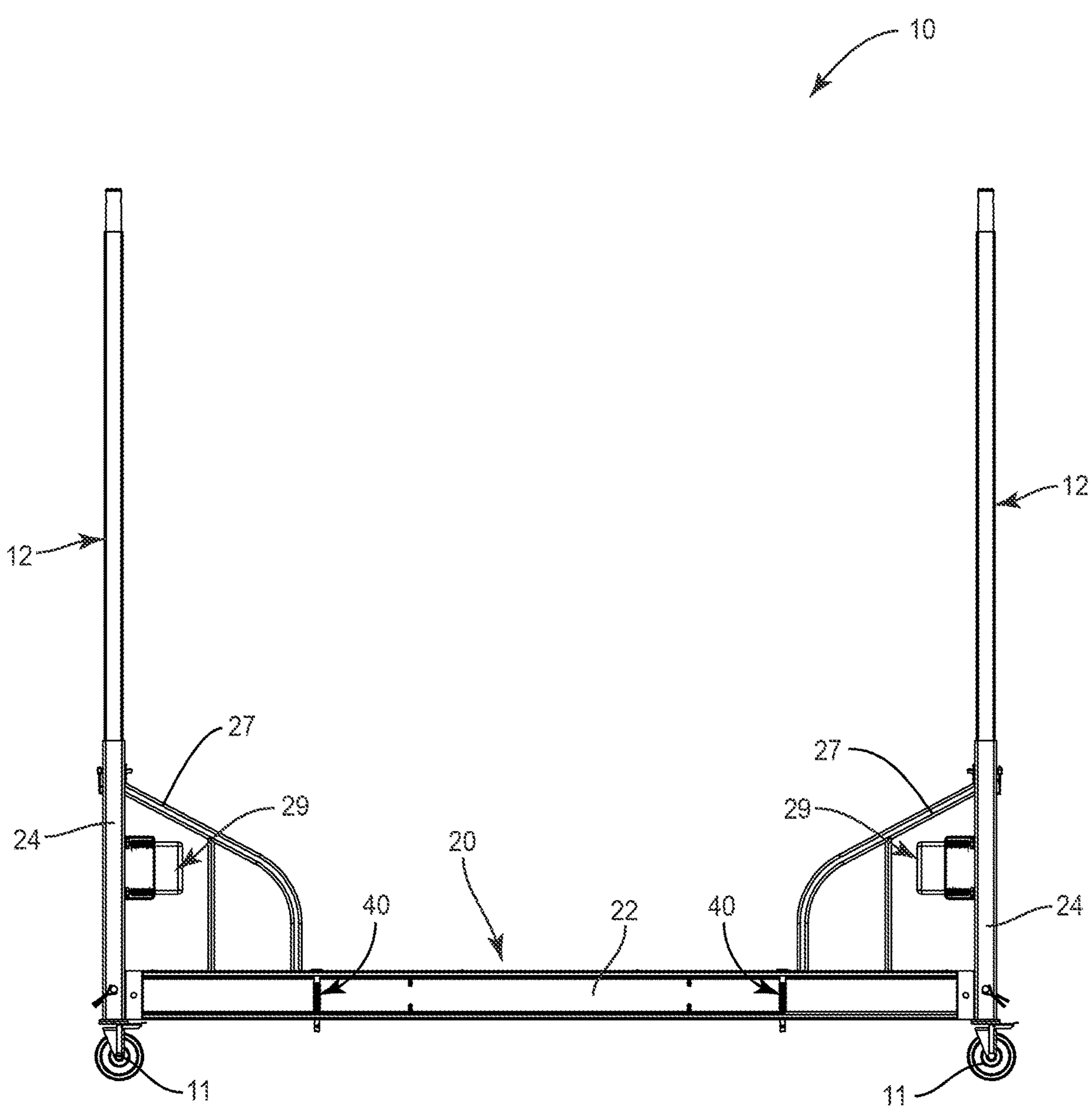
FIG. 3 shows a side view of the scaffold of FIG. 1 with the platform in an inverted orientation and adjusted to bottom of the ladder frame.
Figure 4:
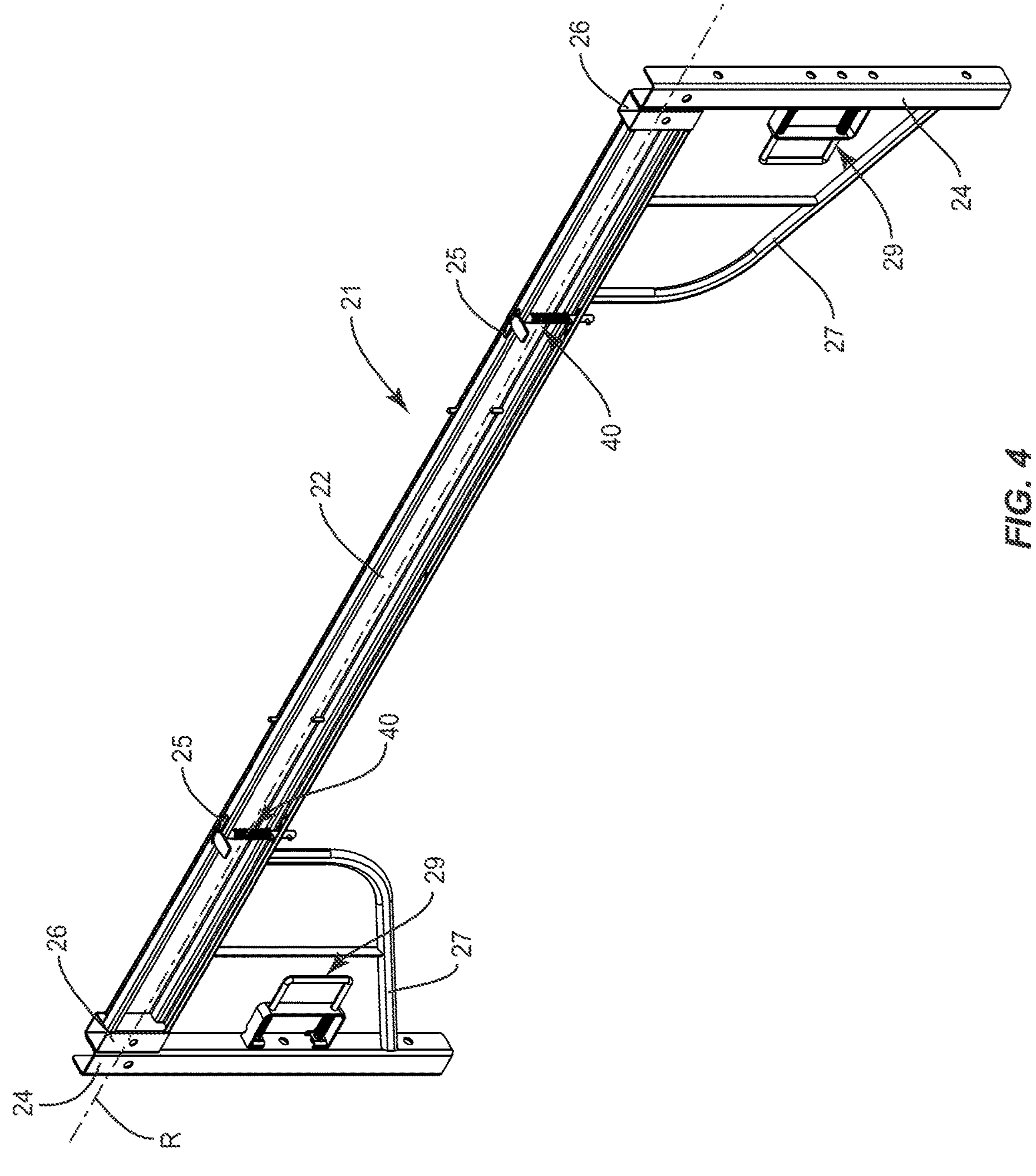
FIG. 4 shows a perspective view of a side rail assembly with two latch assemblies.
Figure 5:
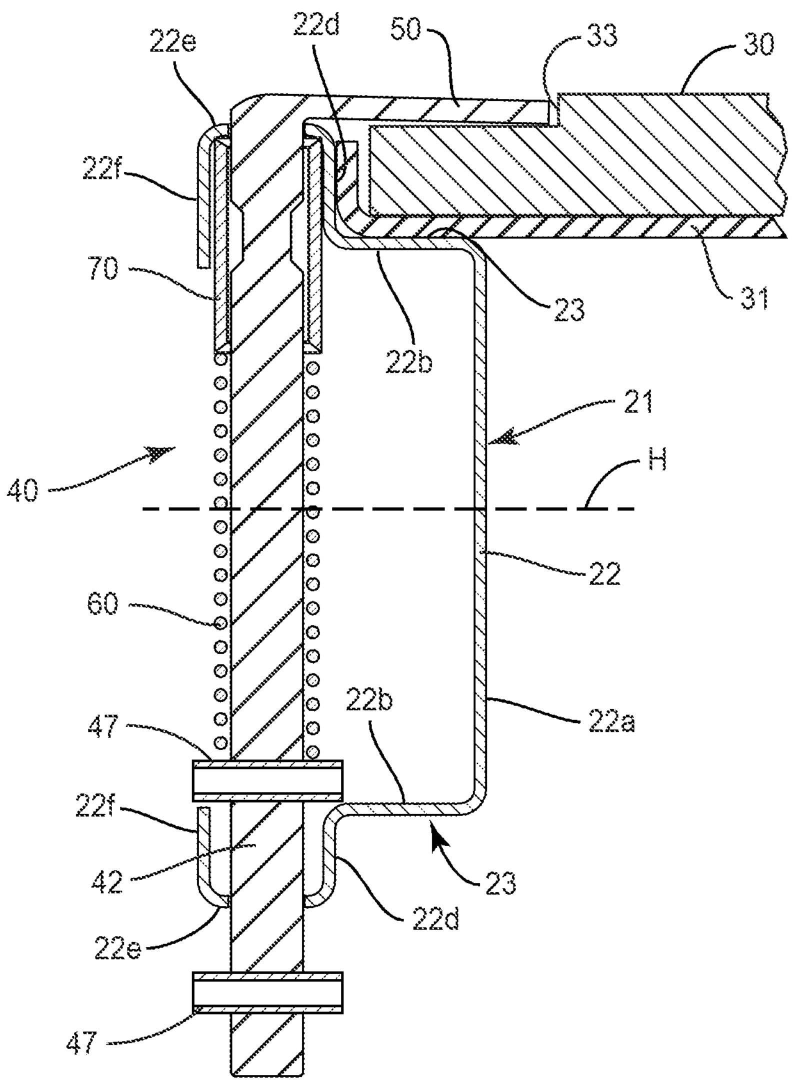
FIG. 5 shows a cross-section view of exemplary side rail and associated latch assembly.

The platform 20 includes two side rail assemblies 21 that extend between the ladder frames 12 and a deck 30 that is supported by the side rail assemblies 21. Each side rail assembly 21 includes a side rail 22 and two guide channels 24 at opposing ends of the side rail 22. The side rails 22 are elongate along a rail longitudinal axis R and are configured to provide a support surface 23 for the deck 30 in two orientations, sometimes referred to herein as the normal orientation (FIG. 2) and inverted orientation (FIG. 3). An exemplary cross-section of the side rail 22 is shown in FIG. 4. The side rail 22 is advantageously symmetrical about a horizontal plane H, and includes a central web 22*a* with two parallel flanges 22*b* the outer surfaces of which form support surfaces 23 for the deck 30 in the first and second orientations respectively. A bounding wall 22*d* extends up/down from each flange 22*b* to an outer section 22*e*. The outer section 22*e* advantageously forms the portion of the side rail 22 farthest vertically outward from the plane H. Additional stiffening flanges 22*f* may extend inward from the outer sections 22*e* opposite the bounding walls 22*d*. Relevant to the present discussion, the support surfaces 23 are conceptually recessed relative to the outer sections 22*e* by gap amount less than the thickness of the deck 30, so that the deck 30 may rest on one or the other support surface 23 and extend above the outer surface of the corresponding outer section 22*e*.

Figure 6:
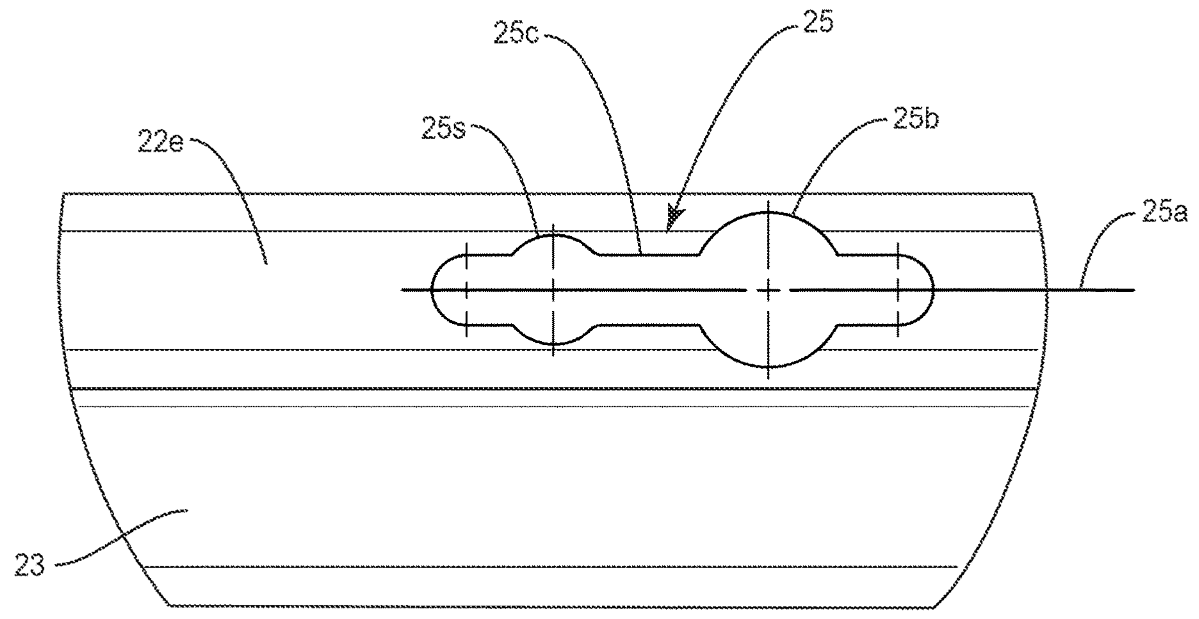
FIG. 6 shows a partial top view of a side rail showing a configuration of the slots.

As shown in FIGS. 4 and 6, compound slots 25 are formed in the outer sections 22*e* of each side rail 22. Within a given side rail 22, the slots 25 are vertically aligned with each other. As explained further below, the latch assemblies 40 can be installed in the side rails 22 via the slots 25 in both the first and second orientations. The slots 25 each include a channel 25*c*, depicted in FIG. 6 as an elongated narrow section of the slot 25, which extends along a slot axis 25*a* that is advantageously parallel to rail axis R. The slots 25 each also include a larger hole 25*b* formed near one end of the channel 25*c* and a smaller hole 25*s* formed near the opposing end of the channel 25*c*. Thus, holes 25*b*,25*s* are spaced from each other along the slot axis 25*a*. The channel 25*c* intersects the holes 25*b*,25*s* so that the channel 25*c* opens to the holes 25*b*,25*s*. The holes 25*b*,25*s* facilitate installation of the latch assemblies 40 as described further below. When a need arises to reverse the side rail assemblies 21 (e.g., from the normal orientation to the inverted orientation), the latch assemblies 40 can be removed and reinstalled in the new orientation without use of any tools. This eliminates the need to have separate latch mechanisms for use in each orientation.

Referring back to FIG. 4, the ends of each side rail 22 connect directly or indirectly to a C-shaped guide channel 24 sized to fit around the vertical supports of the ladder frames 12. The guide channels 24 typically take the form of a C-shaped channel and are configured to slide along the vertical supports 14 of the ladder frames 12 at each end of the scaffold 10 to adjust the height of the platform 20. Suitable openings are formed in the inner flanges of each guide channel 24 for locking the guide channel 24 at a selected height via a suitable a releasable locking mechanism 29. Braces 27 may optionally connect a lower end of each guide channel 24 to the side rail 22 to increase the strength and rigidity of the side rail assembly 21. In some embodiments, a square sleeve 26 may be interposed between each end of the side rail 22 and the guide channel 24 for mounting a safety rail to the platform 20. The sleeve 26 is configured to receive posts of the safety rail (not shown), which can be secured to the sleeve 26 by suitable means. In some embodiments, the side rail 22 and guide channels 24, and optional sleeves 26, for each side rail assembly 21 are welded together to form a unitary structure.

The side rail assemblies 21 are equipped with twist latch assemblies 40, sometimes referred to simply as latch assemblies 40 or latches 40, to hold the deck 30 down once the deck 30 is put in place. The latch assemblies 40 are removably mounted to the side rail 22. The latch assemblies 40 include a shaft 42, a locking tab 50 (or "catch element"), a compressible bias element 60, and a collar 70. The shaft 42 is elongate and extends along a shaft longitudinal axis L, with an upper end portion 43 and a lower end portion 44. A generally round cross-section for the shaft 42 is believed advantageous, but is not required. The lower end portion 44 of the shaft 42 includes a first protrusion 47 closer to the locking tab 50 and a second protrusion 47 farther from the locking tab 50. In some embodiments, the protrusions 47 may be formed by pins, such as spring roll pins, extending through corresponding holes 46 in the shaft.

The shaft 42 has an outer cross-section that is generally sized to be smaller than both the larger holes 25*b* and the smaller holes 25*s*, so that the shaft 42 can be inserted through larger hole 25*b* and a smaller hole 25*s*, but larger than the channel 25*c*. The shaft 42 upper end portion 43 also includes a reduced size section 45 proximate the locking tab 50. The reduced size section 45 has a cross-section that is sized smaller than channel 25*c* so that the shaft 42 can be slid along the channel 25 of slot 25 when the reduced size section 45 is aligned with the slot 25.

The locking tab 50 is fixedly mounted to the upper end portion 43 of the shaft 42, such as by press fit and/or spot welding onto one end of the shaft 42, or integrally formed with the shaft 42. The locking tab 50 extends laterally away from the shaft 42 (e.g., generally perpendicular to the shaft 42 axis) in a cantilever fashion. The locking tab 50 is advantageously generally plate-like. The locking tab 50 may, if desired, have relatively flat side edges and/or taper towards the distal tip 52 (the tab's free end). As discussed further below, the locking tab 50 advantageously has a thickness D2 that is less than or equal to a depth D of a corresponding edge recess 33 in the deck 30.

The bias element 60, sometimes referred to as spring 60, is elastically compressible and is disposed about the shaft 42 between the first protrusion 47 and the locking tab 50. The bias element 60 may advantageously take the form of a simple coil spring, but may take other forms known in the art. The bias element 60 acts to pull the locking tab 50 downward, generally toward the side rail 22, so that the locking tab 50 can help hold the deck 30 in position when the latch assembly 40 is engaged. The bias element 60 advantageously has an outer cross-section that is sized to be larger than the smaller holes 25*s*, but smaller than the larger holes 25*b*.

Figure 7:
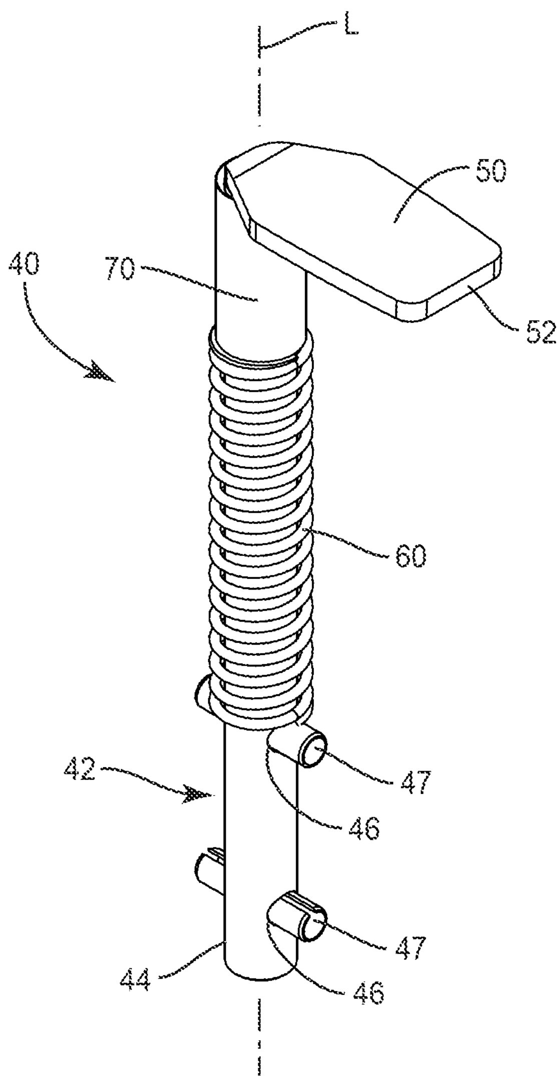
FIG. 7 shows a perspective view of a latch assembly for securing the deck to the side rail, with the collar in the normal position.
Figure 13:
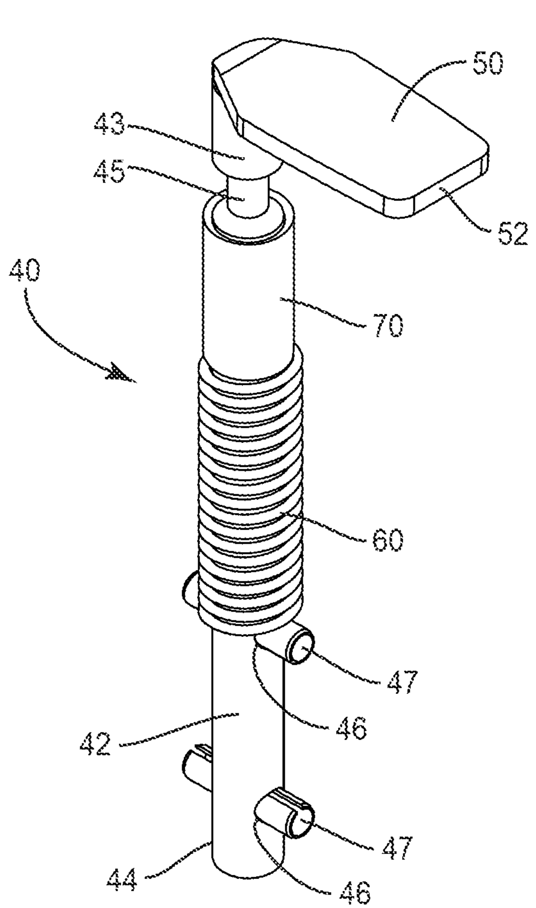
FIG. 13 shows the latch assembly of FIG. 7 with the collar pulled down to the retracted position.
Figure 11:
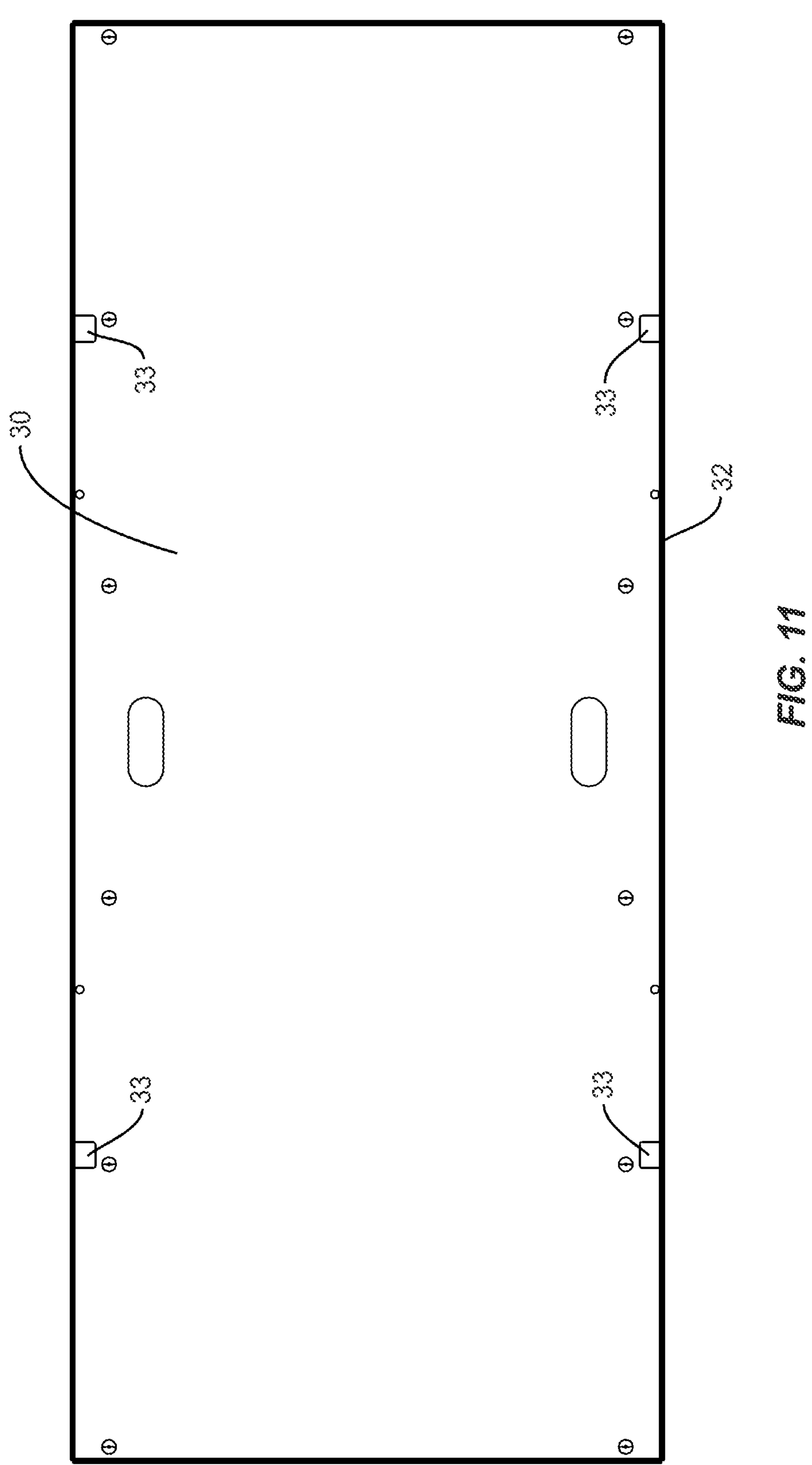
FIG. 11 shows a top view of the deck.
Figure 12:
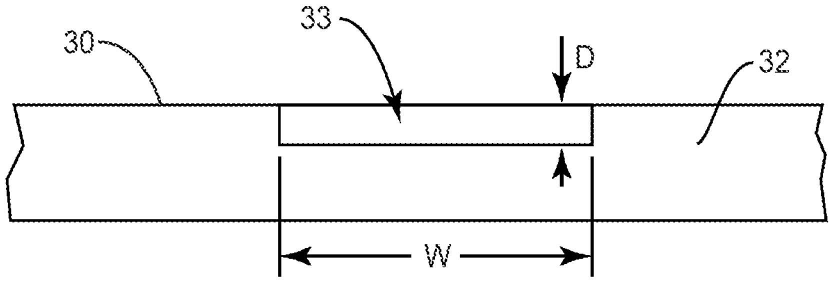
FIG. 12 shows a partial side view of the deck of FIG. 11 showing an edge recess.

The collar 70 is hollow body with a central passage 74 that is mounted so as to be slidable along the shaft 42, up and down parallel to shaft axis L, with the shaft 42 extending through central passage 74. In FIG. 10, the collar 70 is barrel shaped, but any suitable shape may be used, such as a plate-like member. The collar 70 has an outer cross-section that is sized to be larger than the smaller holes 25*s*, but smaller than the larger holes 25*b*. The collar 70 is interposed between the bias element 60 and the locking tab 50. The bias element 60 biases the collar 70 toward the locking tab 50, but allows the collar 70 to slide along the shaft 42. The collar 70 is slidable along the shaft 42 between a normal position closer to the locking tab 50 and a retracted position farther from the locking tab 50. The collar 70 overlaps the reduced sized section when the collar 70 is in the normal position (FIG. 7), and the collar 70 is positioned to expose the reduced size section 45 in the retracted position (FIG. 13). The collar 70 provides an easy way to compress the bias element 60 and acts to help prevent the bias element 60 from becoming entangled in the slot 25 by spacing the bias element 60 from the slot 25 when the latch assembly 40 is engaged, and during its installation and/or removal process.

The deck 30 is advantageously generally flat and rectangular, and is supported on opposing lateral sides by corresponding side rail assemblies 21. In particular, the deck 30 rests on the support surfaces 23 of the side rails 22, with a lateral edge 32 of the deck 30 resting on the corresponding side rail 22. The deck 30 includes one or more edge recesses 33 on each lateral side, positioned so as to be aligned with slots 25 in the side rails 22. This positioning allows the latch assemblies 40 to pass through the slots 25, with the locking tab 50 resting in the corresponding edge recess. The edge recesses 33 are accordingly sized to receive the locking tabs 50, allowing the locking tabs 50 to be seated in the edge recesses 33 so that the top of the locking tabs 50 are flush with or below the top surface of the deck 30. Thus, the width W of the edge recesses 33 are wider than the width W2 of the corresponding locking tab 50, with the depth D of the edge recess 33 being greater than or equal to the thickness D2 of the corresponding locking tab 50. This configuration reduces the opportunity for tripping on the locking tab 50 and reduces the likelihood that the locking tab 50 will be accidentally kicked and/or disengaged. In some embodiments, the deck 30 may be wooden, optionally with a suitable metallic support frame 31 secured thereto that peripherally bounds and undergirds the wood of the deck.

Figure 14:
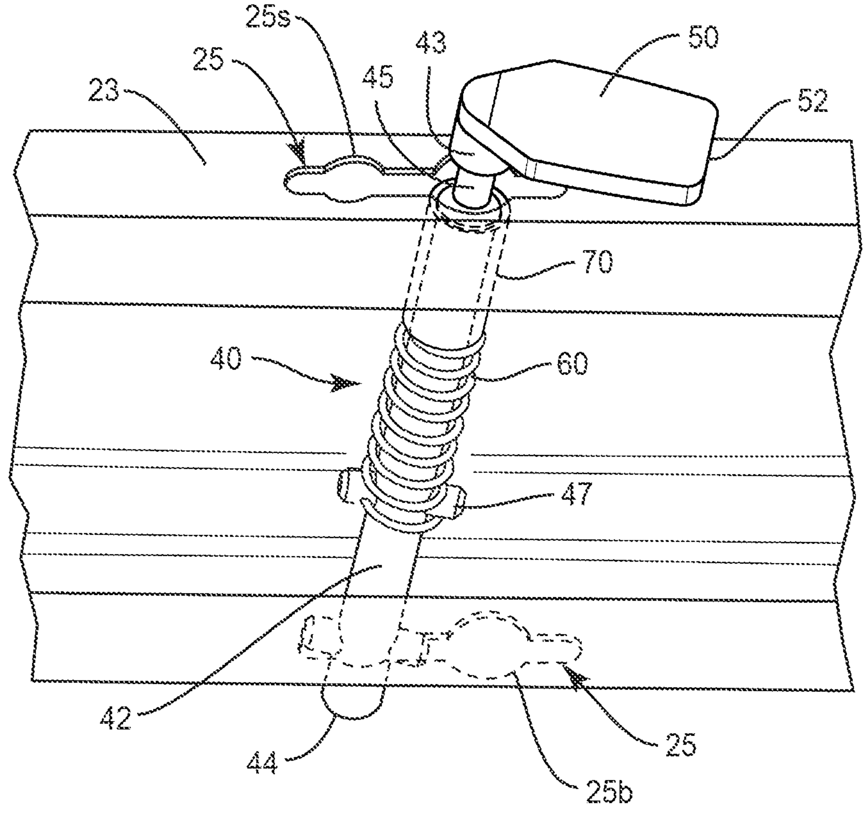
FIG. 14 is a partial perspective view illustrating the installation of the latch assembly, with the collar pulled down to the retracted position so that the shaft can slide along the slot.
Figure 15A:
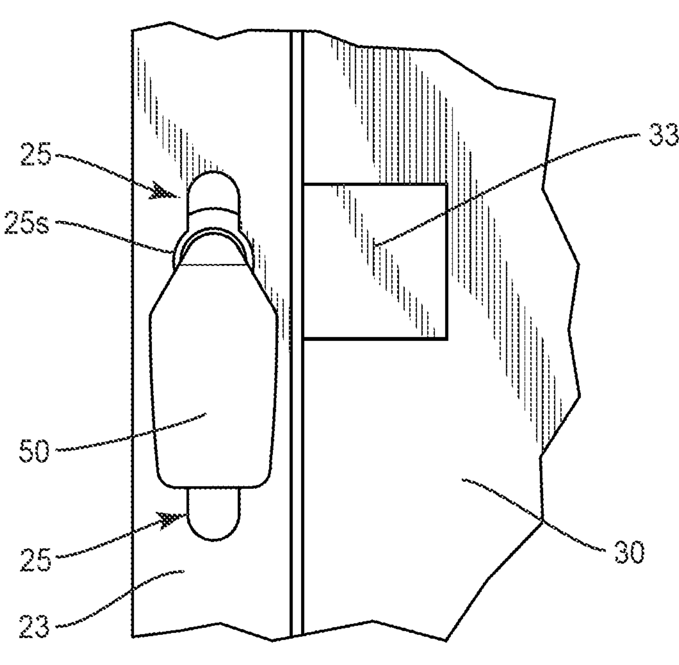
FIGS. 15A and 15B are a partial top plan views showing the latch in assembly disengaged and engaged positions, respectively.
Figure 15B:
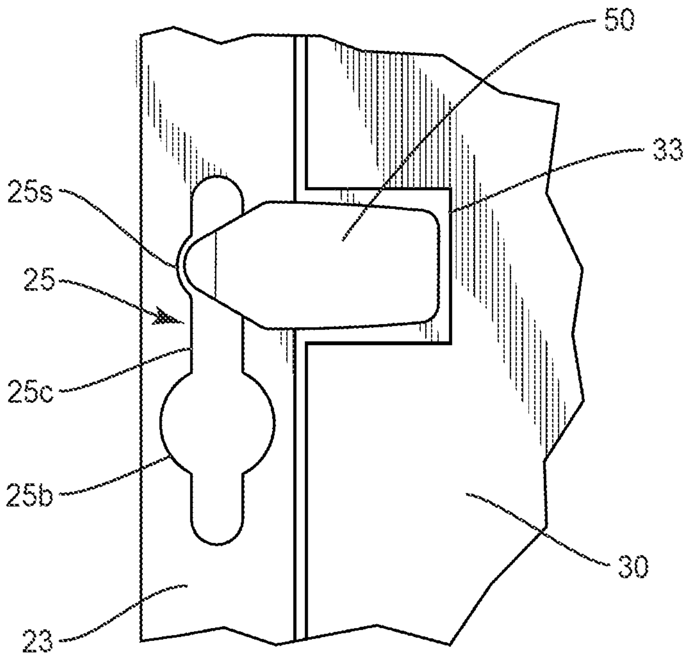

FIG. 14 is a perspective illustrating how a latch assembly 40 is installed on the side rail 22. No tools are required to remove and install the latch assembly 40. The latch assembly 40 is installed by inserting it at an angle through the slots 25 in the upper and lower outer sections 22*e*, and then sliding the upper end portion 43 of the shaft 42 along the upper slot 25. The shaft 42 is inserted at an angle through the larger hole 25*b* in the upper slot 25, which is sized to allow the shaft 42, collar 70, and spring 60 to pass through the slot 25, with the lower end portion 44 of the shaft 42 passing through the smaller hole 25*s* in the lower slot 25. Note that shaft 42 is oriented so that the protrusions 47 are aligned with the channel 25*c* so that the protrusions 47 can fit through the slot 25. The shaft 42 is then rotated so that the protrusions 47 are not aligned with the slot 25, and the lower outer section 22*e* of the side rail 22 is disposed between the protrusions 47, which prevents withdrawal of the shaft 42. The upper end portion 43 of the shaft 42 is then slid along the upper slot 25 until the upper end portion 43 extends through the smaller hole 25*s* of the upper slot 25. To achieve this, the collar 70 is pulled down away from the locking tab 50, so that there is a gap between the collar 70 and the locking tab 50 large enough to expose the reduced size section 45, and the reduced size section 45 is slid into and along the channel 25*c* of the upper slot 25 (between the larger hole 25*b* and the smaller hole 25*s*) until the shaft 42 is aligned with the smaller hole 25*s* of the upper slot 25. The collar 70 may be released at this point, or may be released once the reduced size section 45 is in the channel 25*c*.

To install the deck 30, the shaft 42 of the latch assemblies 40 are rotated as necessary so that the locking tab tip 52 does not overhang the corresponding support surface 23, so that the deck 30 can be placed on the support surface 23 without interference. The deck 30 is then put in place. The latch assemblies 40 are then rotated so that each locking tab 50 is received in the corresponding edge recess 33 of the deck 30. The process is repeated for any other latch assemblies 40. Note that the springs 60 act to pull the shafts 42 downward, so that the locking tabs 50 are pulled down into their corresponding edge recess 33. To remove the deck 30, the process is reversed.

The discussion above has been in the context of the locking tab 50 having a generally rectangular shape. However, other shapes of locking tabs 50 may be used, such as the D-shaped locking tab 50 shown in co-pending U.S. patent application publication US2022/0325538, corresponding to application Ser. No. 17/716,781 filed 8 Apr. 2022, the disclosure of which is incorporated herein by reference in its entirety. The disclosure of co-pending U.S. patent application Ser. No. 18/099,767, filed 20 Jan. 2023, is likewise incorporated herein by reference in its entirety.

The present disclosure may, of course, be carried out in other ways than those specifically set forth herein without departing from essential characteristics of the disclosure. The present embodiments are to be considered as illustrative, and all changes coming within the meaning and equivalency range of the appended claims are intended to be embraced therein.

What is claimed is:

1. A twist latch assembly for a scaffold deck, comprising:
- an elongate shaft having an upper end portion and a lower end portion disposed along a shaft longitudinal axis;
- a locking tab extending from the upper end portion in cantilever fashion and extending laterally away from the shaft longitudinal axis;
- first and second protrusions in the lower end portion and disposed transverse to the longitudinal axis and spaced from each other; wherein the first protrusion is located closer to the locking tab than the second protrusion;
- a collar slidably disposed on the shaft proximate the locking tab; the collar slidable between a normal position closer to the locking tab and a retracted position farther from the locking tab; and
- a compressible bias element disposed about the shaft between the first protrusion and the collar and biasing the collar toward the locking tab;
- wherein the shaft further comprises a reduced size section in the upper end portion proximate the locking tab;
- wherein the collar covers the reduced size section when the collar is in the normal position; and
- wherein the collar is positioned to expose the reduced size section in the retracted position.

2. The twist latch assembly of claim 1, wherein the compressible bias element is a coil spring.

3. The twist latch assembly of claim 1, wherein the locking tab is planar.

4. The twist latch assembly of claim 3, wherein the locking tab has a tip distal from the shaft and tapers in width toward the tip.

5. The twist latch assembly of claim 1:
- wherein the lower end portion of the shaft has first and second through holes disposed transverse to the longitudinal axis and spaced from each other;
- wherein the first protrusion is formed by a first pin extending through the first through hole; and
- wherein the second protrusion is formed by a second pin extending through the second through hole.

6. The twist latch assembly of claim 1, wherein the locking tab is integrally formed with the shaft.

7. A side rail assembly for a scaffold, comprising:
- a side rail configured to be supported between two ladder frames in first and second orientations, the side rail comprising:
  - first and second support surfaces for supporting a deck of the scaffold in the first and second orientations respectively; the first and second support surfaces disposed on opposing sides of a horizontal plane;
  - upper and lower outer sections disposed generally parallel to and farther from the horizontal plane than the first and second support surfaces;
  - first and second slots disposed in the upper and lower outer sections, respectively; wherein the first and second slots are vertically aligned;
- a twist latch assembly comprising a shaft, a collar slidable along the shaft, a locking tab, and a compressible bias element to bias the locking tab into engagement with the deck and secure the deck against one of the support surfaces of the side rail depending on the orientation of the side rail assembly; wherein the twist latch assembly is configured to be removably engaged with the first and second slots of the side rail in both the first and second orientations;

wherein the shaft comprises a reduced size section in an upper end portion proximate the locking tab;

wherein the collar is slidable between a normal position closer to the locking tab and a retracted position farther from the locking tab; wherein the collar covers the reduced size section when the collar is in the normal position; wherein the collar is positioned to expose the reduced size section in the retracted position; and wherein the twist latch assembly is configured so that the collar is disposed between the bias element and the first slot when the locking tab is engaged with the deck and the deck is resting on the first support surface.

8. The side rail assembly of claim 7, further comprising a first guide channel and a second guide channel, the side rail being disposed between the guide channels and extending along a longitudinal axis of the side rail assembly, wherein the guide channels extend vertically away from the side rail.

9. The side rail assembly of claim 7, wherein each slot comprises:

a channel extending parallel to a longitudinal axis of the side rail;

a first hole that is wider than the channel and the shaft;

a second hole that is spaced away from, and wider than, the first hole; and wherein both the first hole and the second hole intersect the channel.

10. The side rail assembly of claim 9, wherein the reduced size section is sized to fit through the channel; wherein the reduced size section is configured to slide within the channel during installation of the twist latch assembly into the side rail.

11. The side rail assembly of claim 9, wherein the collar is sized larger than the first hole and sized to fit through the second hole.

12. The side rail assembly of claim 7, wherein the bias element comprises a coil spring disposed around the shaft of the latch assembly and arranged to bias the locking tab in a downward direction when the latch assembly is installed in the side rail.

13. The side rail assembly of claim 12, wherein the coil spring coils around the shaft in a diameter wider than the first hole of each of the slots and narrower than the second hole of each of the slots.

14. The side rail assembly of claim 7:

wherein the locking tab is planar;

wherein the locking tab has a tip distal from the shaft and tapers in width toward the tip.

15. The side rail assembly of claim 7, further comprising first and second protrusions extending laterally from the shaft; wherein, when the locking tab is engaged with the deck, the second protrusion is below the lower outer section and the first protrusion is disposed between the first and second outer sections.

16. A scaffold comprising:

first and second ladder frames;

an adjustable height platform configured to be supported between the first and second ladder frames at a user selected height in an adjustment range, the adjustable height platform comprising:

a pair of spaced-apart side rail assemblies extending between the ladder frames; each side rail assembly comprising a side rail;

a deck supported on opposing sides by the side rails, the deck including at least one recess in a top surface of the deck adjacent one of the edges of the deck;

at least one twist latch assembly removably mounted to each side rail, each twist latch assembly comprising:

a locking tab configured for engagement with the recess in the top surface of the deck to secure the deck on the side rails;

a shaft having a reduced size section in an upper portion proximate the locking tab;

a bias element configured to bias the locking tab into engagement with a corresponding recess of the at least one recess;

a collar slidable on the shaft and disposed between the bias element and the locking tab; wherein the collar is slidable along the shaft to selectively cover and expose the reduced size section;

wherein each twist latch assembly extends through corresponding slots in a corresponding side rail and is rotatable between:

a disengaged position where the locking tab does not overlap the deck allowing the deck to be installed or removed from the side rails; and an engaged position in which the locking tab extends over the top surface of the deck and engages with a respective one of the at least one recess in the deck so that the locking tab is flush with or below the top surface of the deck.

17. The scaffold of claim 16, wherein the at least one twist latch assembly mounted to each side rail comprises a respective pair of twist latch assemblies removably mounted to each side rail, and wherein the at least one recess in the top surface of the deck comprises a pair of recesses adjacent each of the opposing edges of the deck for engagement with corresponding twist latch assemblies.

18. The scaffold of claim 16:

wherein each side rail comprises:

first and second support surfaces for supporting the deck when the side rail assemblies are in first and second orientations respectively; the first and second support surfaces disposed on opposing sides of a horizontal plane;

upper and lower outer surfaces disposed generally parallel to and farther from the horizontal plane than the first and second support surfaces;

first and second slots disposed in the upper and lower outer surfaces, respectively; wherein the first and second slots are vertically aligned;

wherein the side rail assemblies are reversible between the first and second orientations;

wherein the twist latch assembly extends through the first and second slots.

19. The scaffold of claim 18:

wherein each slot comprises:

a channel extending parallel to a longitudinal axis of the side rail;

a first hole that is wider than the channel;

a second hole that is spaced away from, and wider than, the first hole; and wherein both the first hole and the second hole intersect the channel; and wherein the shaft of the twist latch assembly has a cross-section sized to be larger than the first hole and smaller than the second hole; wherein the reduced size section is sized to fit through the channel; wherein the reduced size section is configured to slide within the channel during installation of the twist latch assembly into the corresponding side rail.

* * * * *